US011984092B2

(12) United States Patent
Pan

(10) Patent No.: US 11,984,092 B2
(45) Date of Patent: May 14, 2024

(54) DISPLAY PANEL AND DISPLAY DEVICE

(71) Applicant: WUHAN CHINA STAR OPTOELECTRONICS TECHNOLOGY CO., LTD., Hubei (CN)

(72) Inventor: You Pan, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 610 days.

(21) Appl. No.: 17/051,080

(22) PCT Filed: Aug. 28, 2020

(86) PCT No.: PCT/CN2020/112022

§ 371 (c)(1),
(2) Date: Oct. 27, 2020

(87) PCT Pub. No.: WO2022/036742

PCT Pub. Date: Feb. 24, 2022

(65) Prior Publication Data

US 2023/0154429 A1 May 18, 2023

(30) Foreign Application Priority Data

Aug. 19, 2020 (CN) ......................... 202010836278.8

(51) Int. Cl.

| | |
|---|---|
| ***G09G 3/36*** | (2006.01) |
| ***G02F 1/1368*** | (2006.01) |
| ***G09G 3/3266*** | (2016.01) |
| ***G11C 19/28*** | (2006.01) |

(52) U.S. Cl.

CPC ......... *G09G 3/3677* (2013.01); *G09G 3/3266* (2013.01); *G09G 2330/06* (2013.01)

(58) Field of Classification Search

CPC ............... G09G 3/3266; G09G 3/3677; G09G 2300/0408; G09G 2310/0202; G09G 2310/0281; G09G 2310/0286; G09G 2330/06; H10K 59/122

See application file for complete search history.

(56) References Cited

U.S. PATENT DOCUMENTS

| | | | | |
|---|---|---|---|---|
| 2005/0195151 A1* | 9/2005 | Ko | G09G 3/3674 | 345/100 |
| 2011/0169793 A1 | 7/2011 | Chen et al. | | |
| 2016/0180964 A1* | 6/2016 | Hu | G09G 3/3677 | 377/64 |

(Continued)

FOREIGN PATENT DOCUMENTS

| | | |
|---|---|---|
| CN | 103198867 A | 7/2013 |
| CN | 107749269 A | 3/2018 |

(Continued)

*Primary Examiner* — Lin Li

(57) ABSTRACT

The present application discloses a display panel and a display device. The display panel includes a non-display region and a gate driver on array (GOA) unit region in the non-display region. The GOA unit region includes multi-level GOA units arranged in multiple columns, thereby improving a space limitation problem associated with arranging a plurality of GOA units in a display panel while the display panel achieves high resolution.

16 Claims, 10 Drawing Sheets

102a

(56) References Cited

U.S. PATENT DOCUMENTS

| | | | | |
|---|---|---|---|---|
| 2016/0284323 | A1* | 9/2016 | Neugebauer | G06F 3/1415 |
| 2017/0307944 | A1* | 10/2017 | Xing | G02F 1/1368 |
| 2017/0345373 | A1* | 11/2017 | Kang | G09G 3/3266 |
| 2018/0144701 | A1* | 5/2018 | Huang | G09G 3/3696 |
| 2018/0218701 | A1* | 8/2018 | Yi | G11C 19/28 |
| 2019/0196618 | A1* | 6/2019 | Lee | G09G 3/3677 |
| 2019/0229154 | A1* | 7/2019 | Tang | H10K 59/40 |
| 2020/0074912 | A1* | 3/2020 | Kitsomboonloha | G09G 3/2092 |
| 2022/0245109 | A1* | 8/2022 | Hatami-Hanza | G06N 7/01 |
| 2023/0016926 | A1* | 1/2023 | Chen | G09G 3/3266 |

FOREIGN PATENT DOCUMENTS

| | | | |
|---|---|---|---|
| CN | 111312188 | A | 6/2020 |
| CN | 111367126 | A | 7/2020 |
| CN | 111383576 | A | 7/2020 |

* cited by examiner

DISPLAY PANEL AND DISPLAY DEVICE

FIELD OF INVENTION

The present application is related to the field of display technology, and specifically, to a display panel and a display device.

BACKGROUND OF INVENTION

In order to achieve a narrow bezel design, a gate driving circuit is integrated into an array substrate in a display device of the prior art. Control of a pixel driving circuit is achieved by gate driver on array (GOA) technology integrated into the array substrate. However, with an increasing demand for high-resolution requirements of display devices, pixel sizes and spaces between scan lines are gradually reduced, and the number of required GOA units is gradually increased. In the prior art, sizes of GOA units are affected by thin-film transistors in the array substrate, so the sizes of the GOA cannot be less than or equal to 40 microns. Therefore, it is difficult to arrange a plurality of GOA units in a limited space.

SUMMARY OF INVENTION

The present application provides a display panel and a display device, which can improve a space limitation problem associated with arranging a plurality of gate driver on array (GOA) units in a display panel while the display panel achieves high resolution.

The present application provides a display panel including a non-display region and a GOA unit region in the non-display region. The GOA unit region includes multi-level GOA units arranged in multiple columns.

In an embodiment, the GOA unit region includes a first GOA unit region and a second GOA unit region. The multi-level GOA units in the first GOA unit region are odd-numbered GOA units. The multi-level GOA units in the second GOA unit region are even-numbered GOA units.

In an embodiment, the first GOA unit region includes n rows and m columns of the GOA units. A GOA unit at an i-th row and a j-th column is $G_{2m(i-1)+2j-1}$.

In an embodiment, the second GOA unit region includes x rows and y columns of the GOA units. A GOA unit at a z-th row and a w-th column is $G_{2y(z-1)+2w}$.

In an embodiment, the first GOA unit region includes n rows and m columns of the GOA units. A GOA unit at an i-th row and a j-th column is $G_{2m(i-1)+2j-1}$, and the GOA unit at a (i+1)-th row and the j-th column is $G_{2m(i+1)-2j+1}$, wherein i is an odd number.

In an embodiment, the second GOA unit region includes x rows and y columns of the GOA units. A GOA unit at a z-th row and a w-th column is $G_{2y(z-1)+2w}$, and the GOA unit at a (z+1)-th row and the w-th column is $G_{2y(z+1)-2w+2}$, wherein z is an odd number.

In an embodiment, the non-display region includes a first non-display region and a second non-display region, which are disposed on two opposite sides of a display region of the display panel. The first GOA unit region is positioned in the first non-display region. The second GOA unit region is positioned in the second non-display region.

In an embodiment, at least two columns of the GOA units are arranged symmetrically to each other.

In an embodiment, each of the GOA units includes an input end, an output end, and a pull-up module and a pull-down module connected to the input end. The pull-up module is configured to control one of the GOA units to turn on in response to a turn-on signal received by the input end. The pull-down module is configured to control one of the GOA units to turn off in response to a turn-off signal received by the input end. The output end is configured to output a scan signal when one of the GOA units responses to the turn-on signal and a clock signal received by the input end.

In an embodiment, the GOA unit region includes P levels of the GOA units. A k-th level GOA unit is turned on in response to an output signal of a (k−2)-th level GOA unit and is turned off in response to an output signal of a (k+2)-th level GOA unit, and k is greater than 2.

In an embodiment, the first GOA unit region includes a first subregion and a second subregion. The first subregion includes n1 rows and m1 columns of GOA units. The second subregion includes an electrostatic discharge protective circuit and n2 rows and m2 columns of GOA units.

In an embodiment, a number of columns of the GOA units in the first subregion is greater than a number of columns of the GOA units in the second subregion.

In an embodiment, a difference between the number of columns of the GOA units in the first subregion and the number of columns of the GOA units in the second subregion is greater than or equal to 1.

In an embodiment, the second subregion includes at least four rows of the GOA units.

The present application further provides a display device including a display panel. The display panel includes a non-display region and a gate driver on array (GOA) unit region in the non-display region. The GOA unit region includes multi-level GOA units arranged in multiple columns.

In an embodiment, the GOA unit region includes a first GOA unit region and a second GOA unit region. The multi-level GOA units in the first GOA unit region are odd-numbered GOA units. The multi-level GOA units in the second GOA unit region are even-numbered GOA units.

In an embodiment, the first GOA unit region includes n rows and m columns of the GOA units. A GOA unit at an i-th row and a j-th column is $G_{2m(i-1)+2j-1}$.

In an embodiment, the second GOA unit region includes x rows and y columns of the GOA units. A GOA unit at a z-th row and a w-th column is $G_{2y(z-1)+2w}$.

In an embodiment, the first GOA unit region includes n rows and m columns of the GOA units. A GOA unit at an i-th row and a j-th column is $G_{2m(i-1)+2j-1}$, and the GOA unit at a (i+1)-th row and the j-th column is $G_{2m(i+1)-2j+1}$, wherein i is an odd number.

In an embodiment, the second GOA unit region includes x rows and y columns of the GOA units. A GOA unit at a z-th row and a w-th column is $G_{2y(z-1)+2w}$, and the GOA unit at a (z+1)-th row and the w-th column is $G_{2y(z+1)-2w+2}$, wherein z is an odd number.

Compared with the prior art, in the display panel and the display device provided by the present application, the display panel includes the non-display region and the GOA unit region in the non-display region, and the GOA unit region includes multi-level GOA units arranged in multiple columns. Therefore, the space limitation problem of arranging the plurality of GOA units in the display panel is improved while the display panel achieves high resolution.

DETAILED DESCRIPTION OF PREFERRED EMBODIMENTS

In order to make purposes, technical solutions, and effects of the present application clearer and more specific, the present application is further described in detail below with reference to the accompanying drawings and examples. It should be understood that the specific embodiments described herein are only used to explain the application, and are not used to limit the present application.

Figure 1A:
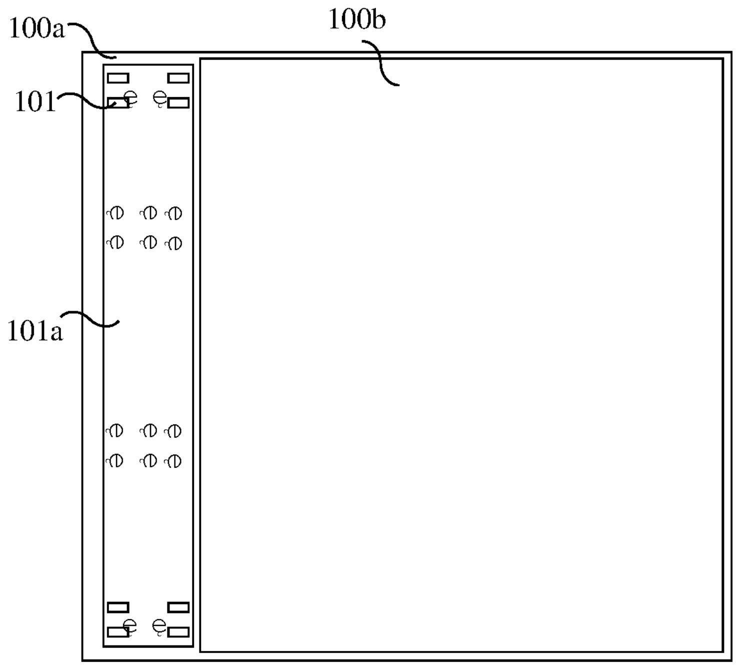
FIGS. 1A and 1B are schematic structural diagrams of display panels according to embodiments provided by the present application.
Figure 1B:
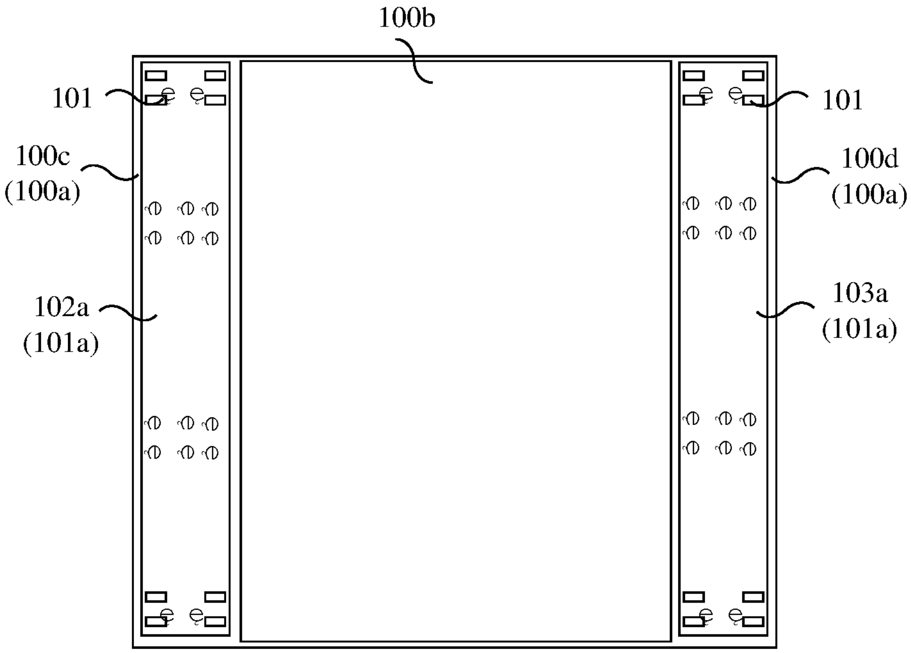

FIGS. 1A and 1B are schematic structural diagrams of display panels according to embodiments provided by the present application. FIGS. 2A to 2E are schematic structural diagrams of first gate driver on array (GOA) unit regions according to embodiments provided by the present application. FIGS. 3A to 3D are schematic structural diagrams of second GOA unit regions according to embodiments provided by the present application.

The present application provides a display panel including a non-display region 100*a* and a GOA unit region 101*a* in the non-display region 100*a*. The GOA unit region 101*a* includes multi-level GOA units 101 arranged in multiple columns, so that a plurality of GOA units 101 are distributed in the non-display region 100*a* with multiple columns. A space limitation problem of arranging the plurality of GOA units 101 in the display panel is improved while the display panel achieves high resolution.

Each of the GOA units 101 includes an input end, an output end, and a pull-up module and a pull-down module connected to the input end. The pull-up module is configured to control one of the GOA units 101 to turn on in response to a turn-on signal received by the input end. The pull-down module is configured to control one of the GOA units 101 to turn off in response to a turn-off signal received by the input end. The output end is configured to output a scan signal when one of the GOA units 101 responses to the turn-on signal and a clock signal received by the input end.

The output ends of the plurality of GOA units 101 are all connected to the scan lines in the display panel and are configured to transmit the scan signal to the display panel through the scan lines.

The turn-on signal includes a first turn-on signal STV and a second turn-on signal. The first turn-on signal STV is configured to turn on a first level GOA unit $G_1$ in the GOA units 101. Furthermore, the first turn-on signal STV is configured to turn on the first level GOA unit $G_1$ and a second level GOA unit $G_2$ in the GOA units 101. The second turn-on signal is configured to turn on the rest of the GOA units 101. The second turn-on signal can be transmitted individually or can be provided by the cascaded GOA units 101.

If the second turn-on signal is provided by the cascaded GOA units 101, the output end of a k-th level GOA unit $G_k$ is connected to the input ends of subsequent q levels of the GOA units 101, so that a k-th level scan signal $S_k$ output from the k-th level GOA unit $G_k$ is used as a turn-on signal of the subsequent q levels of GOA units 101, thereby turning on the subsequent q level of the GOA units 101.

Furthermore, the k-th level GOA unit $G_k$ can be connected to input ends of previous q levels of the GOA units 101, so that the k-th level scan signal $S_k$ output from the k-th level GOA unit $G_k$ is used as the turn-off signal of the previous q levels of GOA units 101, thereby turning off the previous q level of the GOA units 101, wherein q=±1, ±2, ±3, etc., q is determined as a positive integer to indicate that it is used in the subsequent q levels of the GOA units 101, and q is determined as a negative integer to indicate that it is used in the previous q levels of the GOA units 101.

Specifically, if q=±1, the GOA unit region includes P levels of the GOA units 101. The first level GOA unit $G_1$ in the GOA units 101 is turned on in response to the first turn-on signal STV and output a first level scan signal $S_1$; the second level GOA unit $G_2$ in the GOA units 101 is turned on in response to the first level scan signal $S_1$ and output a second level scan signal $S_2$; the first level GOA unit $G_1$ is turned off in response to the second level scan signal $S_2$; and a third level GOA unit $G_3$ is turned on in response to the second level scan signal $S_2$. Similarly, a k-th level GOA unit $G_k$ is turned on in response to a (k−1)-th level scan signal $S_{k-1}$ output from a (k−1)-th level GOA unit $G_{k-1}$ and output a k-th level scan signal $S_k$, the (k−1)-th level GOA unit $G_{k-1}$ is turned off in response to the k-th level scan signal $S_k$ output from the k-th level GOA unit $G_k$, a (k+1)-th level GOA unit $G_{k+1}$ is turned on in response to the k-th level scan signal $S_k$ output from the k-th level GOA unit $G_k$ and output a (k+1)-th level scan signal $S_{k+1}$, and the k-th level GOA unit $G_k$ is turned off in response to the (k+1)-th level scan signal $S_{k+1}$ output from the (k+1)-th level GOA unit $G_{k+1}$. In this manner, the plurality of GOA units 101 of the GOA unit region complete a cycle of work until a P-th level GOA unit in the GOA units 101 is turned on and output a P-th level scan signal $S_P$. Because the first level GOA unit $G_1$ is turned on in response to the first turn-on signal STV, k is greater than 1 (k>1).

In FIGS. 2A to 2E and 3A to 3D, q=±2 is taken as an example for description. Specifically, the GOA unit region includes P levels of the GOA units 101. The first level GOA unit $G_1$ and the second level GOA unit $G_2$ in the GOA units 101 are turned on in response to the first turn-on signal STV and respectively output a first level scan signal $S_1$ and a second level scan signal $S_2$; the third level GOA unit $G_3$ is turned on in response to the first level scan signal $S_1$ output from the first level GOA unit $G_1$ and output a third level scan signal $S_3$; the first level GOA unit $G_1$ is turned off in response to the third level scan signal $S_3$; and a fifth level GOA unit $G_5$ is turned on in response to the third level scan signal $S_3$. Similarly, the k-th level GOA unit $G_k$ is turned on in response to a (k−2)-th level scan signal $S_{k-2}$ output from a (k−2)-th level GOA unit $G_{k-2}$ and output the k-th level scan signal $S_k$, the (k−2)-th level GOA unit $G_{k-2}$ is turned off in response to the k-th level scan signal $S_k$ output from the k-th level GOA unit $G_k$; a (k+2)-th level GOA unit $G_{k+2}$ is turned on in response to the k-th level scan signal $S_k$ output from the k-th level GOA unit $G_k$ and output a (k+2)-the level scan signal $S_{k+2}$; and the k-th level GOA unit $G_k$ is turned off in response to the (k+2)-the level scan signal $S_{k+2}$ output from the (k+2)-th level GOA unit $G_{k+2}$. In this manner, the plurality of GOA units 101 of the GOA unit region complete a cycle of work until the P-th level GOA unit in the GOA units 101 is turned on and output the P-th level scan signal $S_P$. Because the first level GOA unit $G_1$ and the second level GOA unit $G_2$ are turned on in response to the first turn-on signal STV, k is greater than 2 (k>2).

Understandably, the plurality of GOA units are level-shifted from the first level to the P-th level, which means that after the first level GOA unit $G_1$ is turned on in response to the first turn-on signal STV; the second level GOA unit $G_2$ is turned on in response to the first turn-on signal STV; the third level GOA unit $G_3$ is turned on in response to the first level scan signal $S_1$ output from the first level GOA unit $G_1$, a fourth level GOA unit $G_4$ is turned on in response to the second level scan signal $S_2$ output from the second level GOA unit $G_2$; and so on, until the P-th level GOA unit in the GOA units 101 is turned on in response to a (P–2)-th level scan signal $S_{P-2}$ output from a (P–2)-th level GOA unit $G_{P-2}$ and output the P-th level scan signal $S_P$.

The clock signal is transmitted to the GOA units 101 through a clock signal line connected to an input end of each of the GOA units 101. Furthermore, the input end of each of the GOA units 101 is connected to a plurality of clock signal lines, and moreover, the input end of each of the GOA units 101 is connected to three clock signal lines.

Please refer to FIGS. 1B, 2A to 2E, and 3A to 3D, the GOA unit region 101*a* includes a first GOA unit region 102*a* and a second GOA unit region 103*a*. The multi-level GOA units 101 in the first GOA unit region 102*a* are odd-numbered GOA units, and the multi-level GOA units 101 in the second GOA unit region 103*a* are even-numbered GOA units. As a result, the plurality of GOA units 101 are evenly distributed in the first GOA unit region 102*a* and the second GOA unit region 103*a*.

In addition, when the display panel includes P levels of the GOA units 101, the multi-level GOA units 101 positioned in the first GOA unit region 102*a* can be a previous P/2 levels of the GOA units 101, and the multi-level GOA units 101 positioned in the second GOA unit region 103*a* can be a subsequent P/2 levels of the GOA units 101. Compared with a configuration that the previous P/2 levels of the GOA units 101 are disposed in the first GOA unit region 102*a*, a configuration, which disposed the multi-level odd-numbered GOA units in the first GOA unit region 102*a* and disposed the multi-level even-numbered GOA units in the second GOA unit region 103*a*, can reduce wiring lengths between the P/2 levels and the P/2+1 levels and reduce impedance of wirings.

Figure 2A:
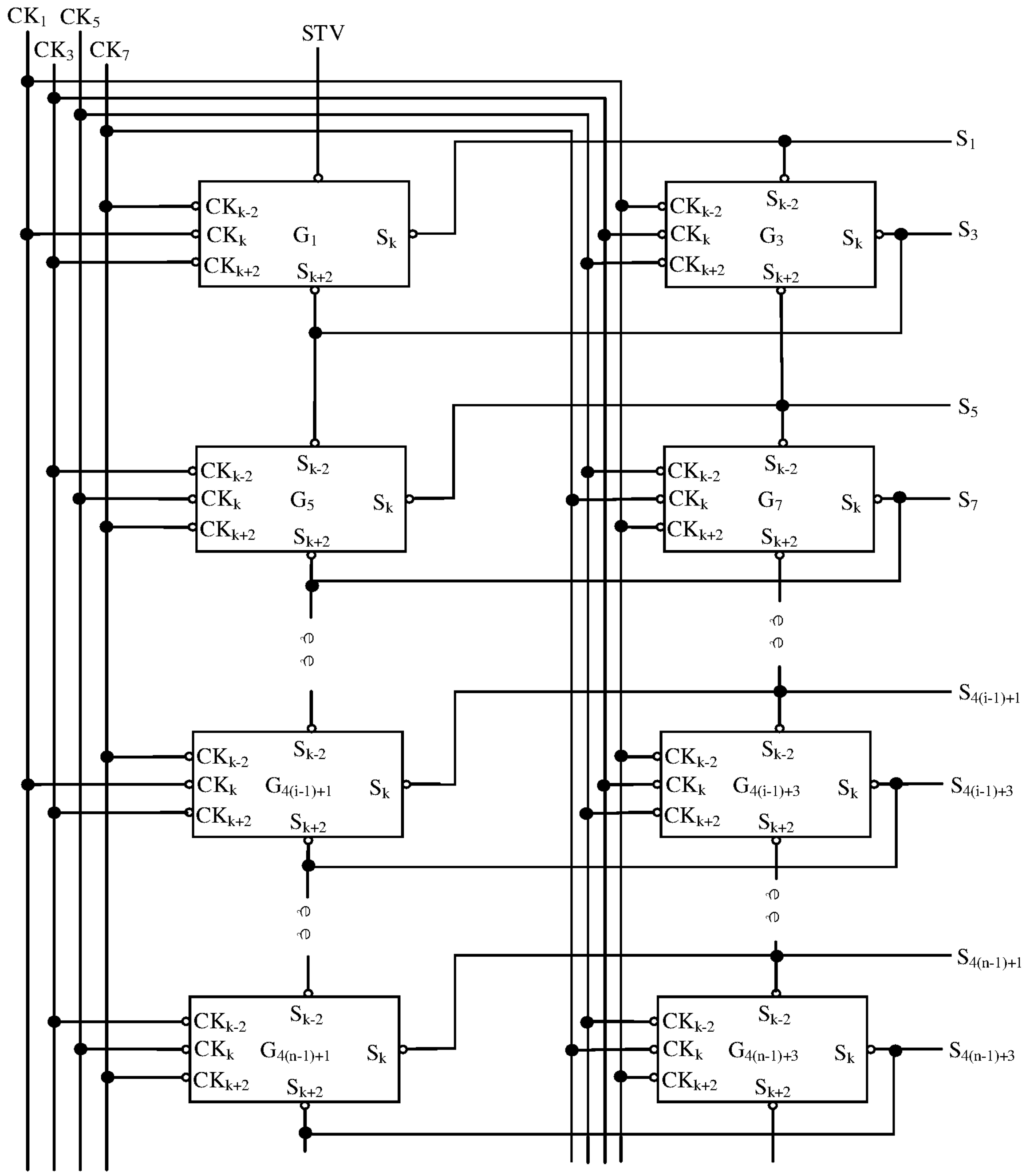
FIGS. 2A to 2E are schematic structural diagrams of first gate driver on array (GOA) unit regions according to embodiments provided by the present application.
Figure 2B:
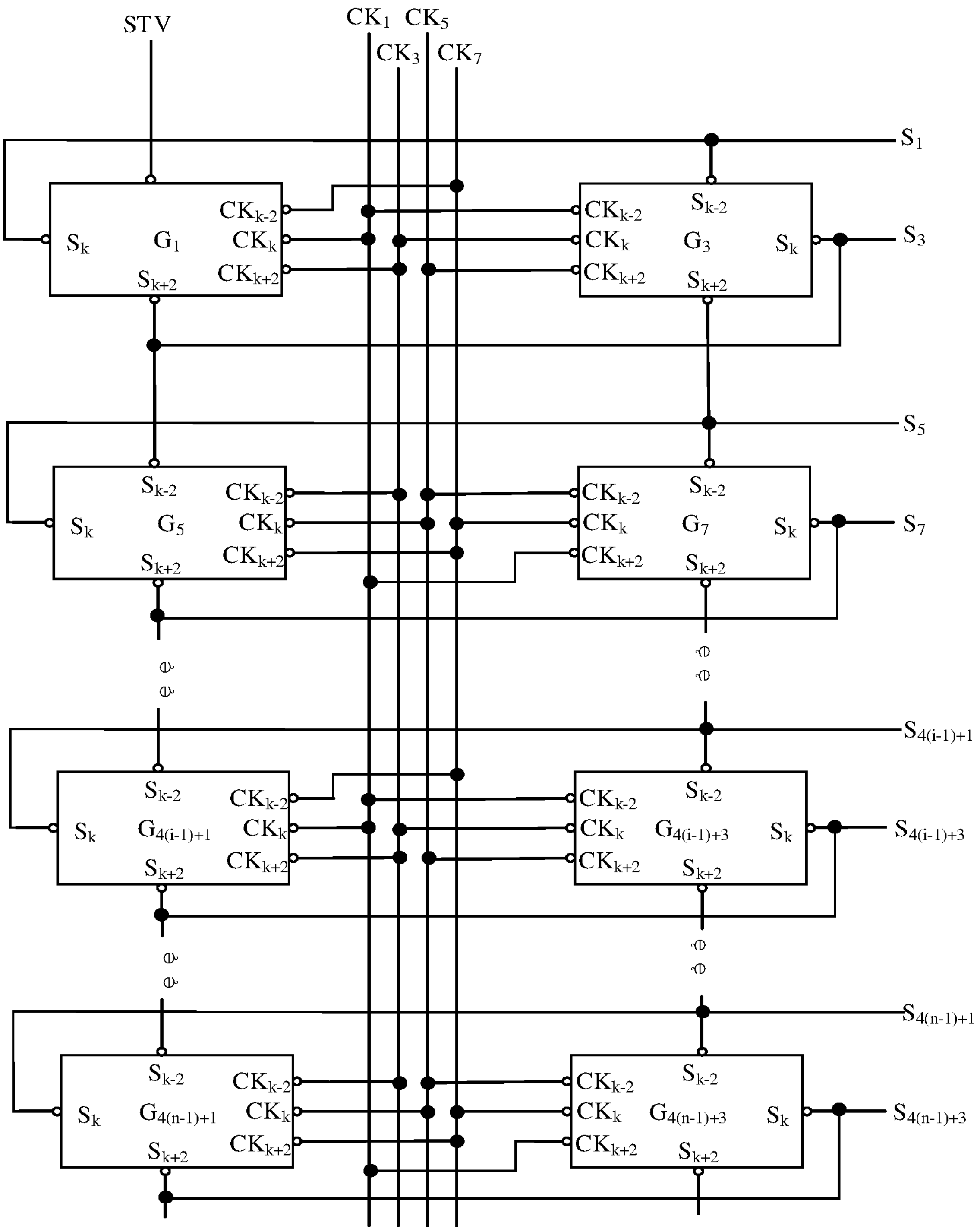

Specifically, please refer to FIGS. 2A to 2B, the first GOA unit region 102*a* includes n rows and m columns of the GOA units 101. A GOA unit at an i-th row and a j-th column is $G_{2m(i-1)+2j-1}$, wherein i=1, 2, 3, . . . , n, j=1, 2, 3, . . . , m, n>1, and m>1. Specifically, if the display panel includes P levels of the GOA units 101, n=2, 3, 4, 5, . . . , P/4, . . . , P/2, etc., and m=2, 3, 4, 5, . . . , P/4, . . . , P/2, etc.

In the first GOA unit region 102*a*, n×m levels of the GOA units 101 are arranged in the following manner:

$$\begin{bmatrix} G_1 & G_3 & \cdots & G_{2j-1} & \cdots & G_{2m-1} \\ G_{2m+1} & G_{2m+3} & \cdots & G_{2m+2j-1} & \cdots & G_{4m-1} \\ G_{4m+1} & G_{4m+3} & \cdots & G_{4m+2j-1} & \cdots & G_{6m-1} \\ \vdots & \vdots & \vdots & \vdots & \vdots & \vdots \\ G_{2m(i-1)+1} & G_{2m(i-1)+3} & \cdots & G_{2m(i-1)+2j-1} & \cdots & G_{2mi-1} \\ \vdots & \vdots & \vdots & \vdots & \vdots & \vdots \\ G_{2m(n-1)+1} & G_{2m(n-1)+3} & \cdots & G_{2m(n-1)+2j-1} & \cdots & G_{2mn-1} \end{bmatrix}$$

Specifically, in the first GOA unit region 102*a* as shown in FIGS. 2A to 2B, m=2 is taken as an example for description. In the plurality of GOA units 101, the first level GOA unit $G_1$ and the third level GOA unit $G_3$ are positioned in a first row, the fifth level GOA unit $G_5$ and a seventh level GOA $G_7$ are positioned in a second row. Similarly, a [4(n–1)+1]-th level GOA unit $G_{4(n-1)+1}$ and a [4(n–1)+3]-th level GOA unit $G_{4(n-1)+3}$ are positioned in an n-th row.

A first column (j=1) includes the first level GOA unit $G_1$, the fifth level GOA unit $G_5$, . . . , a [4(i–1)+1]-th level GOA unit $G_{4(i-1)+1}$ positioned in an i-th row, . . . , and the [4(n–1)+1]–th level GOA unit $G_{4(n-1)+1}$ positioned in the n-th row.

A second column (j=2) includes the third level GOA unit $G_3$, the seventh level GOA unit $G_7$, . . . , a [4(i–1)+3]-th level GOA unit $G_{4(i-1)+3}$ positioned in the i-th row, . . . , and the [4(n–1)+3]-th level GOA unit $G_{4(n-1)+3}$ positioned in the n-th row.

Furthermore, in the first GOA unit region 102*a*, at least two columns of the GOA units 101 are arranged symmetrically to each other. Moreover, the clock signal lines for transmitting the clock signal are disposed between two columns of symmetrical GOA units 101, so that the two columns of symmetrical GOA units 101 share the clock signal.

Specifically, please refer to FIG. 2B, the plurality of GOA units 101 in the first column and the plurality of GOA units 101 in the second column are symmetrical. Clock signal lines OKI, $CK_3$, $CK_5$, and $CK_7$ are disposed between the two columns of symmetrical GOA units 101. The input end of the first level GOA unit $G_1$ is connected to the clock lines $CK_1$, $CK_3$, and $CK_7$, the input end of the third level GOA unit $G_3$ is connected to the clock lines OKI, $CK_3$, and $CK_5$; the input end of the fifth level GOA unit $G_5$ is connected to the clock lines $CK_3$, $CK_5$, and $CK_7$; and the input end of the seventh level GOA unit $G_7$ is connected to the clock lines $CK_5$, $CK_7$, and OKI. Therefore, the first level GOA unit $G_1$ and the third level GOA unit $G_3$ share the clock signal lines $CK_1$ and $CK_3$, the third level GOA unit $G_3$ and the fifth level GOA unit $G_5$ share the clock signal lines $CK_3$ and $CK_5$; the fifth level GOA unit $G_5$ and the seventh level GOA unit $G_7$ share the clock signal lines $CK_5$ and $CK_7$, and the seventh level GOA unit $G_7$ and the first level GOA unit $G_1$ share the clock signal lines $CK_7$ and $CK_1$. In this way, a wiring width of the clock signal lines in the GOA unit region 101*a* is reduced, and a lateral width of the first GOA unit region 102*a* is reduced.

A ninth level GOA unit and the first level GOA unit $G_1$ are connected to same clock signal lines; an eleventh level GOA unit and the third level GOA unit $G_3$ are connected to same clock signal lines; a thirteenth level GOA unit and the fifth level GOA unit $G_5$ are connected to same clock signal lines; and a fifteenth level GOA unit and the seventh level GOA unit $G_7$ are connected to same clock signal lines. In this manner, connection methods of other odd-numbered GOA units and the clock signal lines can be obtained.

Figure 2C:
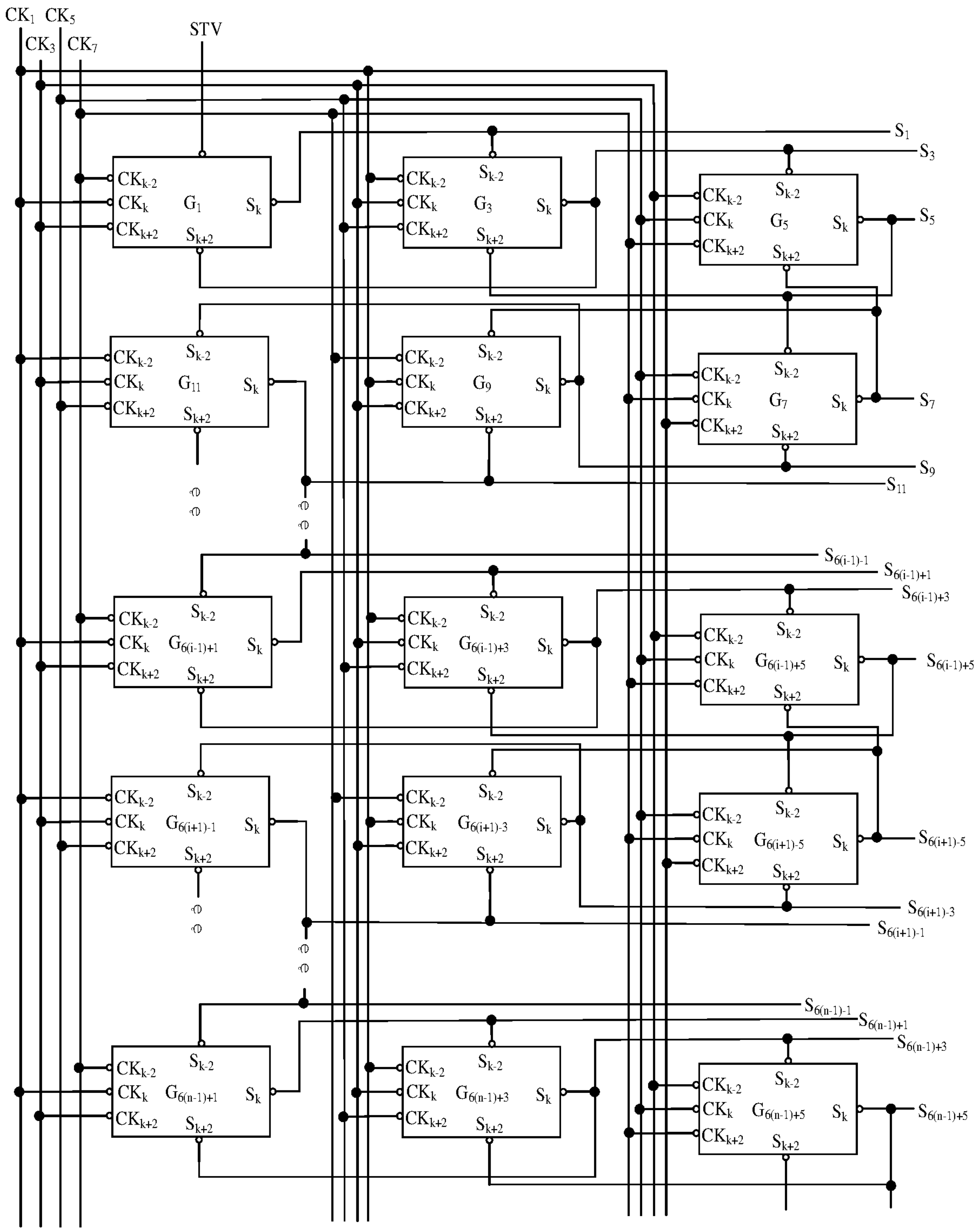
Figure 2D:
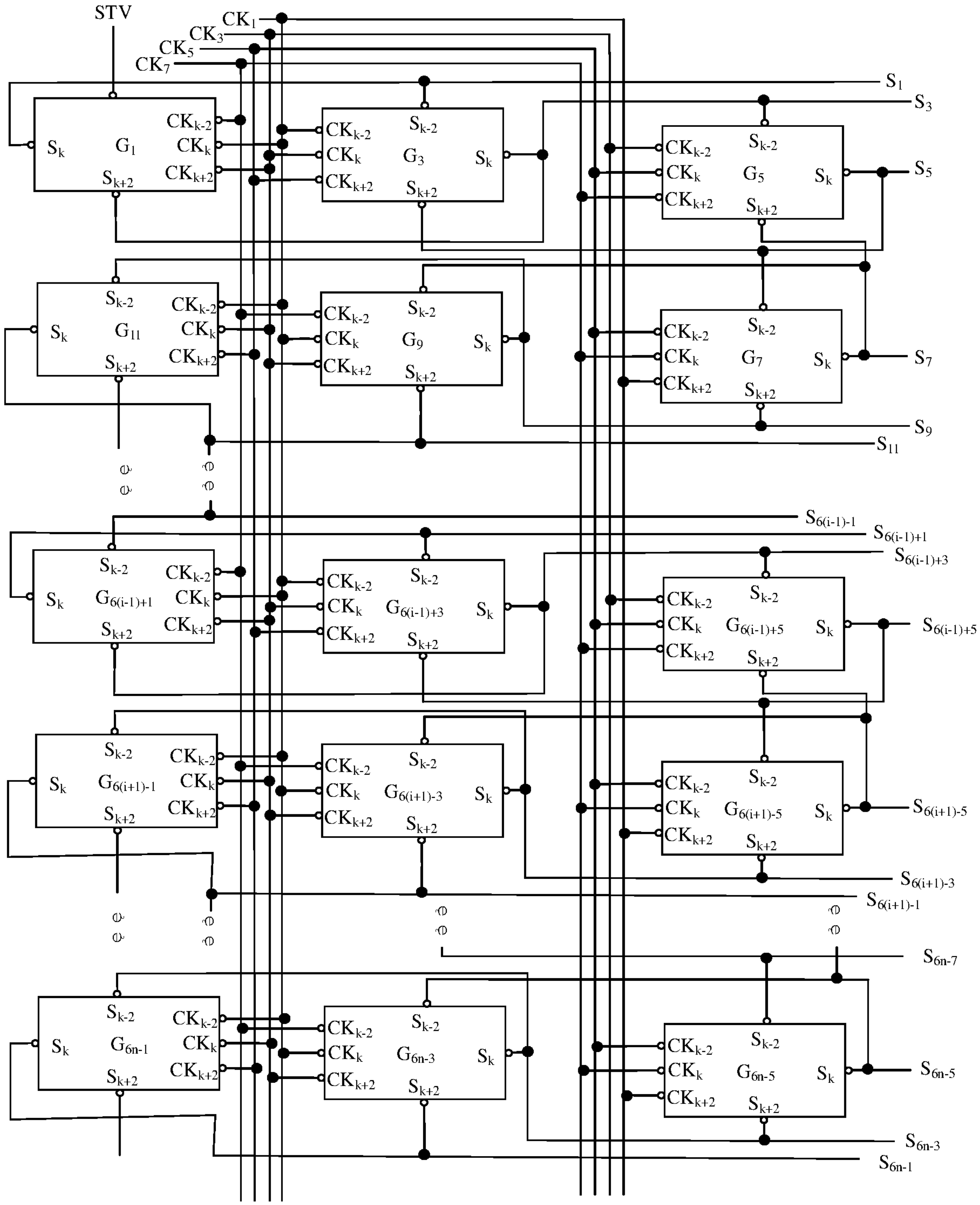

Please continue to refer to FIGS. 2C to 2D, the first GOA unit region includes n rows and m columns of the GOA units. A GOA unit at the i-th row and the j-th column is $G_{2m(i-1)+2j-1}$, and the GOA unit at a (i+1)-th row and the j-th column is $G_{2m(i+1)-2j+1}$, wherein i is an odd number (i.e., i=1, 3, 5, . . . , n), j=1, 2, 3, . . . , m, n>1, and m>1. Specifically, when the display panel includes P levels of the GOA units 101, n=2, 3, 4, 5, 8, 10, 20, 50, 100, . . . , P/4, . . . , P/2, etc., and m=2, 3, 4, 5, . . . , P/4, . . . , P/2, etc.

In the first GOA unit region 102*a*, if n is an odd number, n×m levels of the GOA units 101 are arranged in the following manner:

$$\begin{bmatrix} G_1 & G_3 & \cdots & G_{2j-1} & \cdots & G_{2m-1} \\ G_{4m-1} & G_{4m-3} & \cdots & G_{4m-2j+1} & \cdots & G_{2m+1} \\ G_{4m+1} & G_{4m+3} & \cdots & G_{4m+2j-1} & \cdots & G_{6m-1} \\ \vdots & \vdots & \vdots & \vdots & \vdots & \vdots \\ G_{2m(i-1)+1} & G_{2m(i-1)+3} & \cdots & G_{2m(i-1)+2j-1} & \cdots & G_{2mi-1} \\ G_{2m(i+1)-1} & G_{2m(i+1)-3} & \cdots & G_{2m(i+1)-2j+1} & \cdots & G_{2mi+1} \\ \vdots & \vdots & \vdots & \vdots & \vdots & \vdots \\ G_{2m(n-1)+1} & G_{2m(n-1)+3} & \cdots & G_{2m(n-1)+2j-1} & \cdots & G_{2mn-1} \end{bmatrix}$$

If n is an even number, n×m levels of the GOA units 101 are arranged in the following manner:

$$\begin{bmatrix} G_1 & G_3 & \cdots & G_{2j-1} & \cdots & G_{2m-1} \\ G_{4m-1} & G_{4m-3} & \cdots & G_{4m-2j+1} & \cdots & G_{2m+1} \\ G_{4m+1} & G_{4m+3} & \cdots & G_{4m+2j-1} & \cdots & G_{6m-1} \\ \vdots & \vdots & \vdots & \vdots & \vdots & \vdots \\ G_{2m(i-1)+1} & G_{2m(i-1)+3} & \cdots & G_{2m(i-1)+2j-1} & \cdots & G_{2mi-1} \\ G_{2m(i+1)-1} & G_{2m(i+1)-3} & \cdots & G_{2m(i+1)-2j+1} & \cdots & G_{2mi+1} \\ \vdots & \vdots & \vdots & \vdots & \vdots & \vdots \\ G_{2mn-1} & G_{2mn-3} & \cdots & G_{2mn-2j+1} & \cdots & G_{2m(n-1)+1} \end{bmatrix}$$

Specifically, in the first GOA unit region 102*a* as shown in FIGS. 2C to 2D, m=3 is taken as an example for description. In the plurality of GOA units 101, the first level GOA unit $G_1$, the third level GOA unit $G_3$, and the fifth level GOA unit $G_5$ are positioned in the first row, and the eleventh level GOA unit $G_{11}$, the ninth level GOA unit $G_9$, and the seventh level GOA $G_7$ are positioned in the second row. Similarly, if n is an odd number, a [6(n−1)+1]-th level GOA unit $G_{6(1-1)+1}$, a [6(n−1)+3]-th level GOA unit $G_{6(1-1)+3}$, and a [6(n−1)+5]-th level GOA unit $G_{6(1-1)+5}$ are positioned in the n-th row. If n is an even number, a (6n-1)-th level GOA unit $G_{6n-1}$, a (6n-3)-th level GOA unit $G_{6n-3}$, and a (6n−5)-th level GOA unit $G_{6n-5}$ are positioned in the n-th row.

The first column (j=1) includes the first level GOA unit $G_1$, the eleventh level GOA unit $G_{11}$, . . . , a [6(i−1)+1]-th level GOA unit $G_{6(i-1)+1}$ positioned in the i-th row (odd-numbered row), a [6(i+1)-1]-th level GOA unit $G_{6(i+1)-1}$ positioned in the (i+1)-th row (even-numbered row, i.e., i+1 is an even number), . . . , and the [6(n−1)+1]-th level GOA unit $G_{6(1-1)+1}$ positioned in the n-th row (n is an odd number); or the (6n-1)-th level GOA unit $G_{6n-1}$ positioned in the n-th row (n is an even number).

The second column (j=2) includes the third level GOA unit $G_3$, the ninth level GOA unit $G_9$, . . . , a [6(i−1)+3]-th level GOA unit $G_{6(i-1)+3}$ positioned in the i-th row (odd-numbered row), a [6(i+1)-3]-th level GOA unit $G_{6(i+1)-3}$ positioned in the (i+1)-th row (even-numbered row), . . . , and the [6(n−1)+3]-th level GOA unit $G_{6(1-1)+3}$ positioned in the n-th row (n is an odd number); or a (6n-3)-th level GOA unit $G_{6n-3}$ positioned in the n-th row (n is an even number).

A third column (j=3) includes the fifth level GOA unit $G_5$, the seventh level GOA unit $G_7$, . . . , a [6(i−1)+5]-th level GOA unit $G_{6(i-1)+5}$ positioned in the i-th row (odd-numbered row), a [6(i+1)-5]-th level GOA unit $G_{6(i+1)-5}$ positioned in the (i+1)-th row (even-numbered row), . . . , and the [6(n−1)+5]-th level GOA unit $G_{6(1-1)+5}$ positioned in the n-th row (n is an odd number); or a (6n-5)-th level GOA unit $G_{6n-5}$ positioned in the n-th row (n is an even number).

Furthermore, in the first GOA unit region 102*a*, at least two columns of the GOA units 101 are arranged symmetrically to each other. Moreover, the clock signal lines for transmitting the clock signal are disposed between two columns of symmetrical GOA units 101, so that the two columns of symmetrical GOA units 101 share the clock signal.

Specifically, please refer to FIG. 2D, the plurality of GOA units 101 in the first column and the plurality of GOA units 101 in the second column are symmetrical. The clock signal lines OKI, $CK_3$, $CK_5$, and $CK_7$ are disposed between the two columns of symmetrical GOA units 101. The first level GOA unit $G_1$ and the third level GOA unit $G_3$ share the clock signal lines $CK_1$ and $CK_3$, the first level GOA unit $G_1$ and the ninth level GOA unit $G_9$ share the clock signal lines $CK_1$, $CK_3$, and $CK_7$, and the third level GOA unit $G_3$ and the eleventh level GOA unit $G_{11}$ share the clock signal lines $CK_1$, $CK_3$, and $CK_5$. In this way, the lateral width of the first GOA unit region 102*a* is reduced.

In addition, the GOA units 101 in the odd-numbered rows can be obtained, which are arranged in reverse order of the GOA units 101 in the odd-numbered rows in FIGS. 2A to 2B, and the GOA units 101 in the even-numbered rows can be obtained, which are arranged in same order as the GOA units 101 in the even-numbered rows in FIGS. 2A to 2B. Otherwise, the GOA units 101 in the odd-numbered rows are arranged in reverse order, and the GOA units 101 in the even-numbered rows are arranged in reverse order of the GOA units 101 in the even-numbered rows in FIGS. 2A to 2B. Details are not described herein again.

Figure 2E:
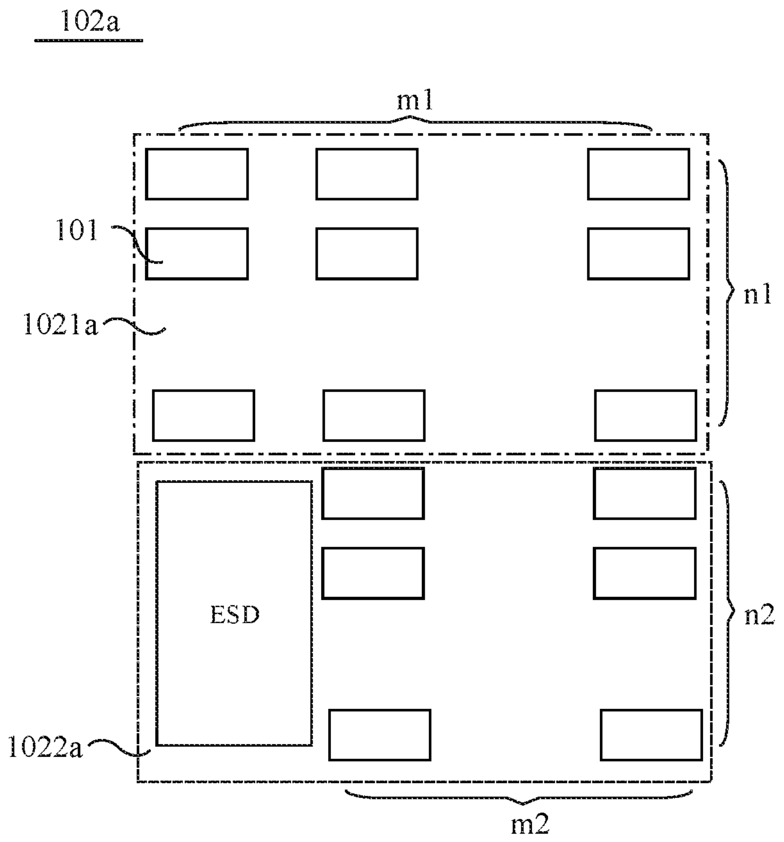

Please continue to refer to FIG. 2E, the first GOA unit region 102*a* includes a first subregion 1021*a* and a second subregion 1022*a*. The first subregion 1021*a* includes n1 rows and m1 columns of GOA units. The second subregion 1022*a* includes n2 rows and m2 columns of GOA units. A number of columns m1 of the GOA units in the first subregion 1021*a* is greater than a number of columns m2 of the GOA units in the second subregion 1022*a*, which means that m1>m2. A sum of a number of rows n1 of the GOA units in the first subregion 1021*a* and a number of rows n2 of the GOA units in the second subregion 1022*a* is equal to a number of rows n of the GOA units in the first GOA unit region 102*a*, which means that n1+n2=n. The second subregion 1022*a* is provided with an electrostatic discharge protective circuit ESD. In this way, a lateral width of the display panel is reduced.

In order to ensure that the second subregion 1022*a* has enough space to place the electrostatic discharge protective circuit ESD, a difference between the number of columns m1 of the GOA units in the first subregion 1021*a* and the number of columns m2 of the GOA units in the second subregion 1022*a* can be configured to be greater than or equal to 1. Furthermore, a difference between n and n1 is greater than or equal to 4, which means that the second subregion 1022*a* includes at least four rows of the GOA units.

The electrostatic discharge protective circuit ESD is connected to the input end of each of the GOA units 101 connected to the clock signal lines, so that the clock signal provided by the driving circuit can be transmitted to each of the GOA units 101. The plurality of GOA units 101 in the first subregion 1021*a* and the second subregion 1022*a* can be arranged in the manner as shown in FIGS. 2A to 2B and/or 2C to 2D. Details are not described herein again.

Please continue to refer to FIGS. 3A to 3D, the second GOA unit region 103*a* includes x rows and y columns of the GOA units 101. A GOA unit at a z-th row and a w-th column is $G_{2y(z-1)+2w}$, wherein z=1, 2, 3, . . . , x, w=1, 2, 3, . . . , y, x>1, and y>1. Specifically, when the display panel includes P levels of the GOA units 101, x=2, 3, 4, 5, 8, 10, 20, 50, 100, . . . , P/4, . . . , P/2, etc., and y=2, 3, 4, 5, . . . , P/4, . . . , P/2, etc.

In the second GOA unit region 103*a*, x×y levels of the GOA units 101 are arranged in the following manner:

$$\begin{bmatrix} G_2 & G_4 & \cdots & G_{2w} & \cdots & G_{2y} \\ G_{2y+2} & G_{2y+4} & \cdots & G_{2y+2w} & \cdots & G_{4y} \\ G_{4y+2} & G_{4y+4} & \cdots & G_{4y+2w} & \cdots & G_{6y} \\ \vdots & \vdots & \vdots & \vdots & \vdots & \vdots \\ G_{2y(z-1)+2} & G_{2y(z-1)+4} & \cdots & G_{2y(z-1)+2w} & \cdots & G_{2zy} \\ \vdots & \vdots & \vdots & \vdots & \vdots & \vdots \\ G_{2y(x-1)+2} & G_{2y(x-1)+4} & \cdots & G_{2y(x-1)+2w} & \cdots & G_{2xy} \end{bmatrix}$$

Figure 3A:
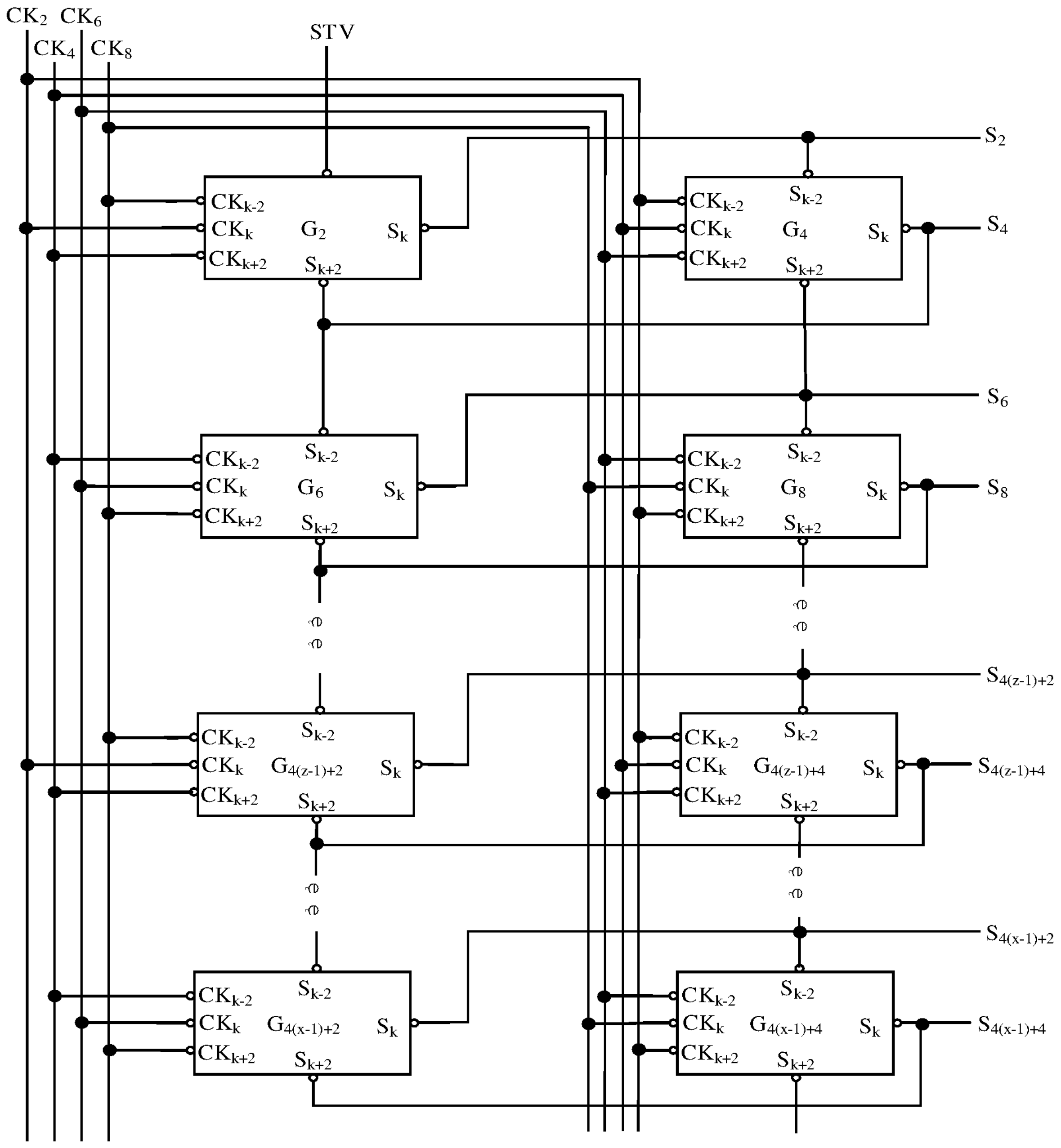
FIGS. 3A to 3D are schematic structural diagrams of second GOA unit regions according to embodiments provided by the present application.
Figure 3B:
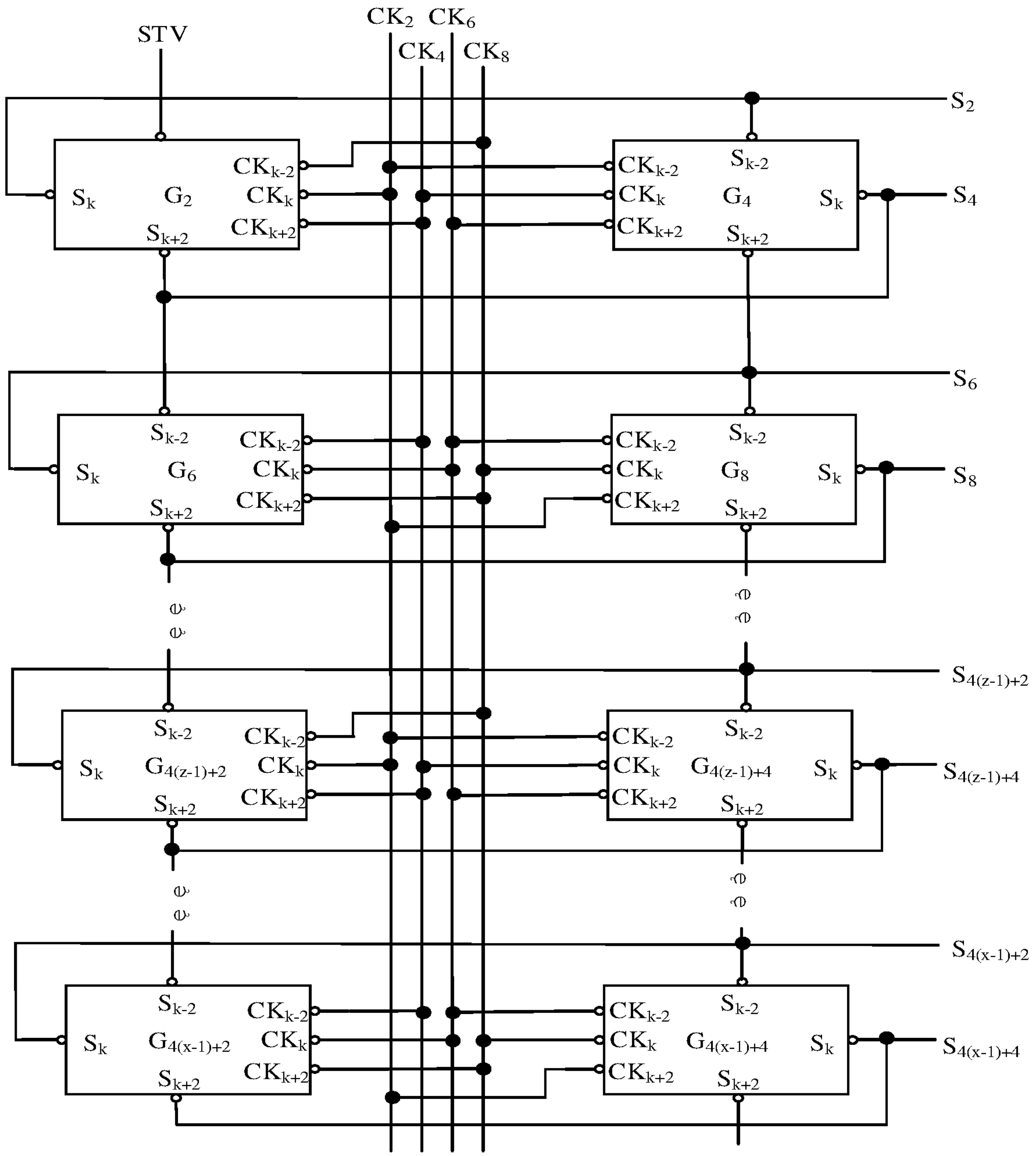

Specifically, in the second GOA unit region 103*a* as shown in FIGS. 3A to 3B, y=2 is taken as an example for description. In the plurality of GOA units 101, the second level GOA unit $G_2$ and the fourth level GOA unit $G_4$ are positioned in the first row, a sixth level GOA unit $G_6$ and a eighth level GOA $G_8$ are positioned in the second row. Similarly, a [4(x−1)+2]-th level GOA unit $G_{4(x-1)+2}$ and a [4(x−1)+4]-th level GOA unit $G_{4(x-1)+4}$ are positioned in an x-th row.

A first column (w=1) includes the second level GOA unit $G_2$, the sixth level GOA unit $G_6$, . . . , a [4(z−1)+2]-th level GOA unit $G_{4(z-1)+2}$ positioned in a z-th row, . . . , and the [4(x−1)+2]-th level GOA unit $G_{4(x-1)+2}$ positioned in the x-th row.

A second column (w=2) includes the fourth level GOA unit $G_4$, the eighth level GOA unit $G_8$, . . . , a [4(z−1)+4]-th level GOA unit $G_{4(z-1)+4}$ positioned in the z-th row, . . . , and the [4(x−1)+4]-th level GOA unit $G_{4(x-1)+4}$ positioned in the x-th row.

Furthermore, in the second GOA unit region 103*a*, at least two columns of the GOA units 101 are arranged symmetrically to each other. Moreover, the clock signal lines for transmitting the clock signal are disposed between two columns of symmetrical GOA units 101, so that the two columns of symmetrical GOA units 101 share the clock signal.

Specifically, please refer to FIG. 3B, the plurality of GOA units 101 in the first column and the plurality of GOA units 101 in the second column are symmetrical. Clock signal lines $CK_2$, $CK_4$, $CK_6$, and $CK_8$ are disposed between the two columns of symmetrical GOA units 101. The input end of the second level GOA unit $G_2$ is connected to the clock lines $CK_2$, $CK_4$, and $CK_8$, the input end of the fourth level GOA unit $G_4$ is connected to the clock lines $CK_2$, $CK_4$, and $CK_6$, the input end of the sixth level GOA unit $G_6$ is connected to the clock lines $CK_4$, $CK_6$, and $CK_8$, and the input end of the eighth level GOA unit $G_8$ is connected to the clock lines $CK_6$, $CK_8$, and $CK_2$. Therefore, the second level GOA unit $G_2$ and the fourth level GOA unit $G_4$ share the clock signal lines $CK_2$ and $CK_4$, the fourth level GOA unit $G_4$ and the sixth level GOA unit $G_6$ share the clock signal lines $CK_4$ and $CK_6$, the sixth level GOA unit $G_6$ and the eighth level GOA unit $G_8$ share the clock signal lines $CK_6$ and $CK_8$, and the eighth level GOA unit $G_8$ and the second level GOA unit $G_2$ share the clock signal lines $CK_8$ and $CK_2$. In this way, a wiring width of the clock signal lines in the second GOA unit region 103*a* is reduced, and a lateral width of the second GOA unit region 103*a* is reduced.

A tenth level GOA unit and the second level GOA unit $G_2$ are connected to same clock signal lines; a twelfth level GOA unit and the fourth level GOA unit $G_4$ are connected to same clock signal lines; a fourteenth level GOA unit and the sixth level GOA unit $G_6$ are connected to same clock signal lines; and a sixteenth level GOA unit and the eighth level GOA unit $G_8$ are connected to same clock signal lines. In this manner, connection methods of other even-numbered GOA units and the clock signal lines can be obtained.

Figure 3C:
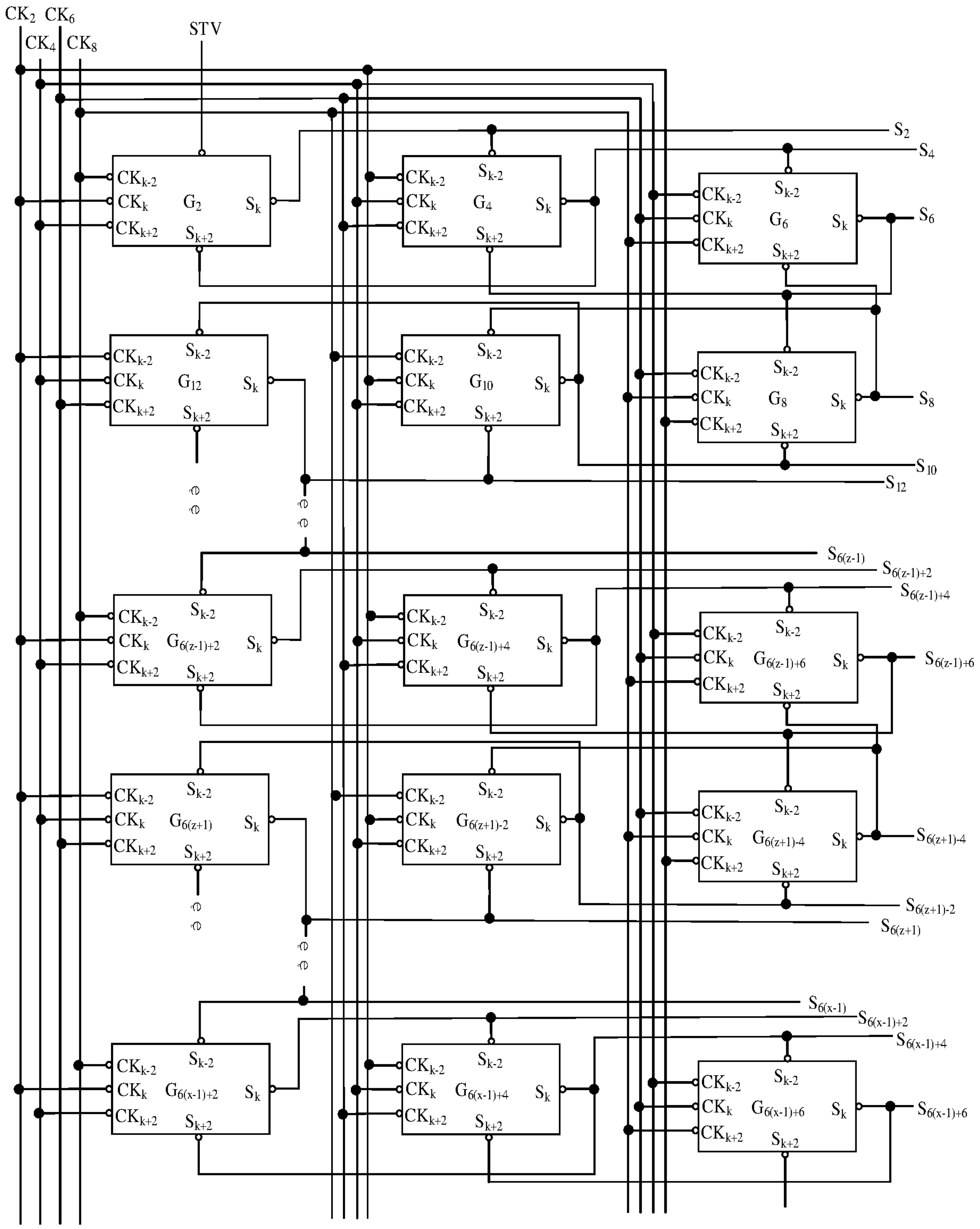
Figure 3D:
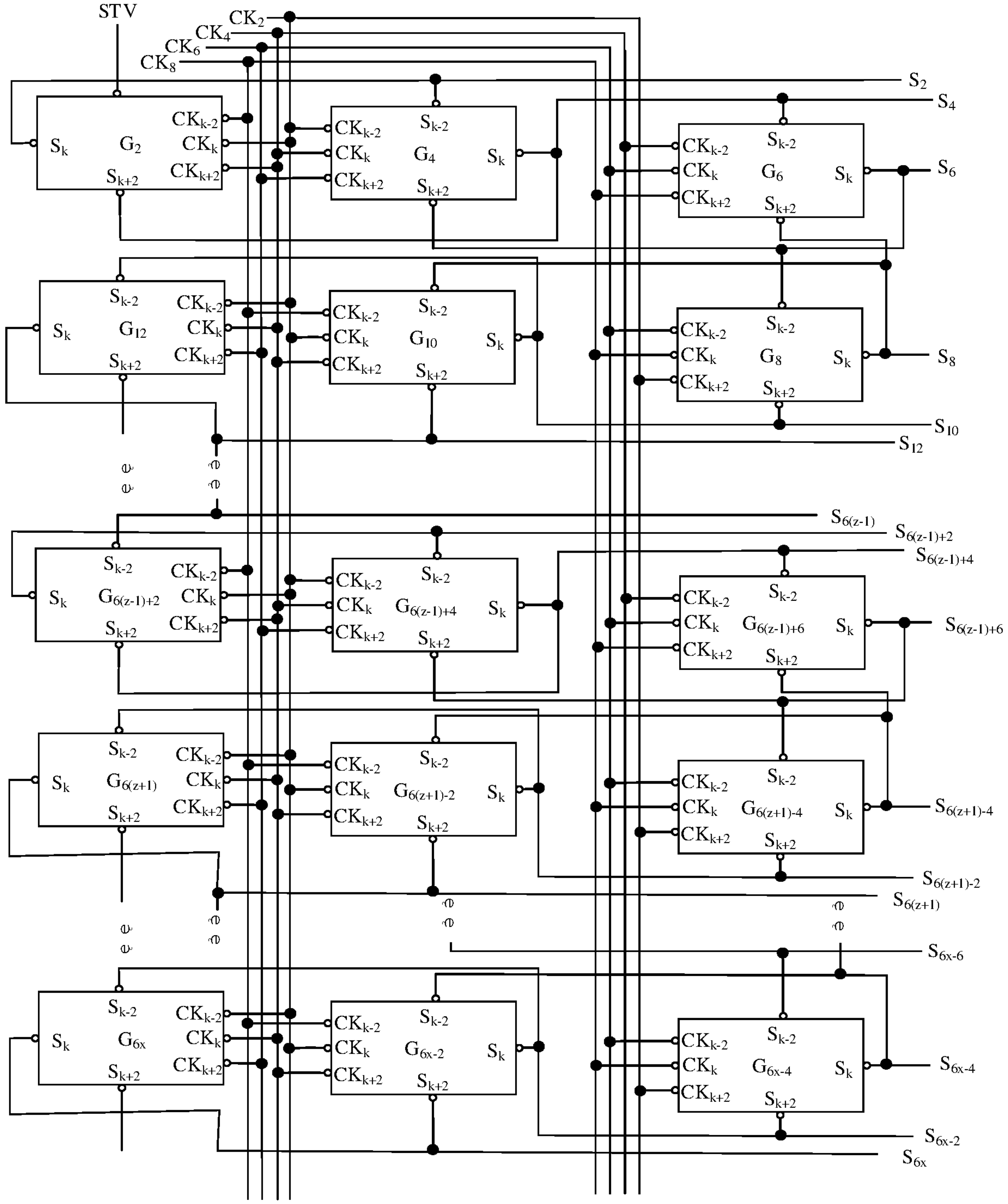

Please continue to refer to FIGS. 3C to 3D, the second GOA unit region includes x rows and y columns of the GOA units. A GOA unit at the z-th row and the w-th column is $G_{2y(z-1)+2w}$, and the GOA unit at a (z+1)-th row and the w-th column is $G_{2y(z+1)-2w+2}$, wherein z is an odd number (i.e., z=1, 3, 5, . . . , and x), w=1, 2, 3, . . . , y, x>1, and y>1. Specifically, when the display panel includes P levels of the GOA units 101, x=2, 3, 4, 5, 8, 10, 20, 50, 100, . . . , P/4, . . . , P/2, etc., and y=2, 3, 4, 5, . . . , P/4, . . . , P/2, etc.

In the second GOA unit region 103*a*, if x is an odd number, x×y levels of the GOA units 101 are arranged in the following manner:

$$\begin{bmatrix} G_2 & G_4 & \cdots & G_{2w} & \cdots & G_{2y} \\ G_{4y} & G_{4y-2} & \cdots & G_{4y-2w+2} & \cdots & G_{2y+2} \\ G_{4y+2} & G_{4y+4} & \cdots & G_{4y+2w} & \cdots & G_{6y} \\ \vdots & \vdots & \vdots & \vdots & \vdots & \vdots \\ G_{2y(z-1)+2} & G_{2y(z-1)+4} & \cdots & G_{2y(z-1)+2w} & \cdots & G_{2zy} \\ G_{2y(z+1)} & G_{2y(z+1)-2} & \cdots & G_{2y(z+1)-2w+2} & \cdots & G_{2zy+2} \\ \vdots & \vdots & \vdots & \vdots & \vdots & \vdots \\ G_{2y(x-1)+2} & G_{2y(x-1)+4} & \cdots & G_{2y(x-1)+2w} & \cdots & G_{2xy} \end{bmatrix}$$

If x is an even number, x×y levels of the GOA units 101 are arranged in the following manner:

$$\begin{bmatrix} G_2 & G_4 & \cdots & G_{2w} & \cdots & G_{2y} \\ G_{4y} & G_{4y-2} & \cdots & G_{4y-2w+2} & \cdots & G_{2y+2} \\ G_{4y+2} & G_{4y+4} & \cdots & G_{4y+2w} & \cdots & G_{6y} \\ \vdots & \vdots & \vdots & \vdots & \vdots & \vdots \\ G_{2y(z-1)+2} & G_{2y(z-1)+4} & \cdots & G_{2y(z-1)+2w} & \cdots & G_{2zy} \\ G_{2y(z+1)} & G_{2y(z+1)-2} & \cdots & G_{2y(z+1)-2w+2} & \cdots & G_{2zy+2} \\ \vdots & \vdots & \vdots & \vdots & \vdots & \vdots \\ G_{2xy} & G_{2xy-2} & \cdots & G_{2xy-2w+2} & \cdots & G_{2y(x-1)+2} \end{bmatrix}$$

Specifically, in the second GOA unit region 103*a* as shown in FIGS. 3C to 3D, m=3 is taken as an example for description. In the plurality of GOA units 101, the second level GOA unit $G_2$, the fourth level GOA unit $G_4$, and the sixth level GOA unit $G_6$ are positioned in the first row; the twelfth level GOA unit $G_{12}$, the tenth level GOA unit GIs, and the eighth level GOA $G_8$ are positioned in the second row. Similarly, if x is an odd number, a [6(x−1)+2]-th level GOA unit $G_{6(x-1)+2}$, a [6(x−1)+4]-th level GOA unit $G_{6(x-1)+4}$, and a [6(x−1)+6]-th level GOA unit $G_{6(x-1)+6}$ are positioned in the x-th row. If x is an even number, a 6x-th level GOA unit $G_{6x}$, a (6x−2)-th level GOA unit $G_{6x-2}$, and a (6x−4)-th level GOA unit $G_{6x-4}$ are positioned in the x-th row.

The first column (w=1) includes the second level GOA unit $G_2$, the twelfth level GOA unit $G_{12}$, . . . , a [6(z−1)+2]-th level GOA unit $G_{6(z-1)+2}$ positioned in the z-th row (odd-numbered row), a 6(z+1)-th level GOA unit $G_{6(z+1)}$ positioned in the (z+1)-th row (even-numbered row, i.e., z+1 is an even number), . . . , and the [6(x−1)+2]-th level GOA unit $G_{6(z-1)+2}$ positioned in the x-th row (x is an odd number); or the 6x-th level GOA unit $G_{6x}$ positioned in the x-th row (x is an even number).

The second column (w=2) includes the fourth level GOA unit $G_4$, the tenth level GOA unit $G_{10}$, . . . , a [6(z−1)+4]-th level GOA unit $G_{6(z-1)+4}$ positioned in the z-th row (odd-numbered row), a [6(z+1)-2]-th level GOA unit $G_{6(z+1)-2}$ positioned in the (z+1)-th row (even-numbered row), . . . , and the [6(x−1)+4]-th level GOA unit $G_{6(x-1)+4}$ positioned in the x-th row (x is an odd number); or a (6x−2)-th level GOA unit $G_{6x-2}$ positioned in the x-th row (x is an even number).

A third column (w=3) includes the sixth level GOA unit $G_6$, the eighth level GOA unit $G_8$, . . . , a [6(z−1)+6]-th level GOA unit $G_{6(z-1)+6}$ positioned in the z-th row (odd-numbered row), a [6(z+1)−4]-th level GOA unit $G_{6(z+1)-4}$ positioned in the (z+1)-th row (even-numbered row), . . . , and the [6(x−1)+6]-th level GOA unit $G_{6(x-1)+6}$ positioned in the x-th row (x is an odd number); or a (6x−4)-th level GOA unit $G_{6x-4}$ positioned in the x-th row (x is an even number).

Please continue to refer to FIG. 3D, the plurality of GOA units 101 in the first column and the plurality of GOA units 101 in the second column are symmetrical. The clock signal lines $CK_2$, $CK_4$, $CK_6$, and $CK_8$ are disposed between the two columns of symmetrical GOA units 101. The second level GOA unit $G_2$ and the fourth level GOA unit $G_4$ share the clock signal lines $CK_2$ and $CK_4$, the second level GOA unit $G_2$ and the tenth level GOA unit $G_{10}$ share the clock signal lines $CK_2$, $CK_4$, and $CK_8$, and the fourth level GOA unit $G_4$ and the twelfth level GOA unit $G_{12}$ share the clock signal lines $CK_2$, $CK_4$, and $CK_6$. In this way, the lateral width of the second GOA unit region 103*a* is reduced.

Furthermore, the second GOA unit region 103*a* includes a third subregion and a fourth subregion. The third subregion includes x1 rows and y1 columns of GOA units, and the fourth subregion includes x2 rows and y2 columns of GOA units, wherein y1>y2, and x1+x2=x. The fourth subregion is provided with the electrostatic discharge protective circuit ESD. In this way, the lateral width of the display panel is reduced.

In addition, the GOA units 101 in the odd-numbered rows can be obtained, which are arranged in reverse order of the GOA units 101 in the odd-numbered rows in FIGS. 3A to 3B, and the GOA units 101 in the even-numbered rows can be obtained, which are arranged in same order as the GOA units 101 in the even-numbered rows in FIGS. 3A to 3B. Otherwise, the GOA units 101 in the odd-numbered rows are arranged in reverse order, and the GOA units 101 in the even-numbered rows are arranged in reverse order of the GOA units 101 in the even-numbered rows in FIGS. 3A to 3B. Details are not described herein again.

Please continue to refer to FIGS. 2A to 2E and 3A to 3D, when the display panel includes P levels of the GOA units 101, a sum of n×m levels of the GOA units 101 and x×y levels of the GOA units 101 is equal to P. n and x can be equal or unequal, and m and y can be equal or unequal.

Please continue to refer to FIG. 1B, the non-display region 100*a* includes a first non-display region 100*c* and a second non-display region 100*d*, which are disposed on two opposite sides of a display region 100*b* of the display panel. The first GOA unit region 102*a* is positioned in the first non-display region 100*c*, and the second GOA unit region 103*a* is positioned in the second non-display region 100*d.*

In addition, odd-numbered GOA units and even-numbered GOA units can also be arranged sequentially, and meanwhile, the GOA unit region 101*a* is only positioned on one side of the display panel. As shown in FIG. 1A, the GOA unit region 101*a* includes R rows and T columns of the GOA units. A GOA unit at a r-th row and a t-th column is $G_{T(r-1)+t}$, wherein r=1, 2, 3, . . . , R, t=1, 2, 3, . . . , T, R>1, and T>1.

The multi-level GOA units 101 can be arranged in accordance with other manners in addition to arrangements shown in FIGS. 2A to 2E and 3A to 3D. Once the multi-level GOA units are ensured to be arranged in multiple columns in the GOA unit region 101*a*, the space limitation problem associated with arranging the plurality of GOA units 101 in the display panel is improved while the display panel achieves high resolution.

The present application further provides a display device including the display panel described above. The display device includes a liquid crystal display device, a flexible display device, etc. The flexible display device includes a light-emitting device. The light-emitting device includes at least one of an organic light-emitting diode, a micro light-emitting diode, or a sub-millimeter light-emitting diode.

Furthermore, the display device includes a virtual reality display device, a projector, a mobile phone, a bracelet, a computer, and other devices.

The present application provides the display panel and the display device. the display panel includes the non-display region 100*a* and the GOA unit region 101*a* in the non-display region 100*a*. The GOA unit region 101*a* includes multi-level GOA units 101 arranged in multiple columns. Therefore, the space limitation problem associated with arranging the plurality of GOA units in the display panel is improved while the display panel achieves high resolution.

In the above embodiments, the descriptions of the various embodiments are different in emphases, for contents not described in detail, please refer to related description of other embodiments. The description of embodiments above is only for helping to understand technical solutions of the present application and its core idea. Understandably, for a person of ordinary skill in the art can make various modifications of the technical solutions of the embodiments of the present application above. However, it does not depart from the scope of the technical solutions of the embodiments of the present application.

What is claimed is:

1. A display panel, comprising a display region and a non-display region disposed at a periphery of the display region, a gate driver on array (GOA) unit region being disposed in the non-display region, wherein multi-level cascaded GOA units are arranged in the GOA unit region, the GOA unit region comprises a first GOA unit region and a second GOA unit region, and odd-numbered GOA units of the multi-level cascaded GOA units are arranged in the first GOA unit region and are arranged in n rows and m columns, and n>1, and m>1, even-numbered GOA units of the multi-level cascaded GOA units are arranged in the second GOA unit region and are arranged in x rows and y columns, x>1 and y>1, wherein the first GOA unit region comprises a first subregion and a second subregion, and wherein n1 rows and m1 columns of the odd-numbered GOA units are arranged in the first subregion, an electrostatic discharge protective circuit and n2 rows and m2 columns of the odd-numbered GOA units are arranged in the second subregion, the electrostatic discharge protective circuit is connected to each of the multi-level cascaded GOA units, and n1>1, m1>1, n2>1 and m2>1.

2. The display panel according to claim 1, wherein a GOA unit at an i-th row and a j-th column in the first GOA unit region is $G_{2m(i-1)+2j-1}$.

3. The display panel according to claim 1, wherein a GOA unit at a z-th row and a w-th column in the second GOA unit region is $G_{2y(z-1)+2w}$.

4. The display panel according to claim 1, wherein a GOA unit at an i-th row and a j-th column in the first GOA unit region is $G_{2m(i-1)+2j-1}$, and a GOA unit at a (i+1)-th row and the j-th column in the first GOA unit region is $G_{2m(i+1)-2j+1}$, wherein i is an odd number.

5. The display panel according to claim 1, wherein a GOA unit at a z-th row and a w-th column in the second GOA unit region is $G_{2y(z-1)+2w}$, and a GOA unit at a (z+1)-th row and the w-th column in the second GOA unit region is $G_{2y(z+1)-2w+2}$, wherein z is an odd number.

6. The display panel according to claim 1, wherein the non-display region comprises a first non-display region and a second non-display region, which are disposed on two opposite sides of a display region of the display panel; and the first GOA unit region is positioned in the first non-display region, and the second GOA unit region is positioned in the second non-display region.

7. The display panel according to claim 1, wherein at least two columns of the multi-level cascaded GOA units are arranged symmetrically to each other.

8. The display panel according to claim 1, wherein in the GOA unit region, a k-th level GOA unit is turned on in response to an output signal of a (k−2)-th level GOA unit and is turned off in response to an output signal of a (k+2)-th level GOA unit, and k is greater than 2.

9. The display panel according to claim 1, wherein a number of columns of the GOA units in the first subregion is greater than a number of columns of the GOA units in the second subregion.

10. The display panel according to claim 9, wherein a difference between the number of columns of the GOA units in the first subregion and the number of columns of the GOA units in the second subregion is greater than or equal to 1.

11. The display panel according to claim 1, wherein the second subregion comprises at least four rows of the GOA units.

12. A display device, comprising a display panel, wherein the display panel comprises a display region and a non-display region disposed at a periphery of the display region, a gate driver on array (GOA) unit region being disposed in the non-display region, and wherein multi-level cascaded GOA units are arranged in the GOA unit region, the GOA unit region comprises a first GOA unit region and a second GOA unit region, and odd-numbered GOA units of the multi-level cascaded GOA units are arranged in the first GOA unit region and are arranged in n rows and m columns, and n>1, and m>1, even-numbered GOA units of the multi-level cascaded GOA units are arranged in the second GOA unit region and are arranged in x rows and y columns, and y>1, wherein the first GOA unit region comprises a first subregion a second subregion, and wherein n1 rows m1 columns of the odd-numbered GOA units are arranged in the first subregion, an electrostatic discharge protective circuit and n2 rows and m2 columns of the odd-numbered GOA units are arranged in the second subregion, the electrostatic discharge protective circuit is connected to each of the multi-level cascaded GOA units, and n1>1, m1>1, n2>1 and m2>1.

13. The display device according to claim 12, wherein a GOA unit at an i-th row and a j-th column in the first GOA unit region is $G_{2m(i-1)+2j-1}$.

14. The display device according to claim 12, wherein a GOA unit at a z-th row and a w-th column in the second GOA unit region is $G_{2y(z-1)+2w}$.

15. The display device according to claim 12, wherein a GOA unit at an i-th row and a j-th column in the first GOA unit region is $G_{2m(i-1)+2j-1}$, and a GOA unit at a (i+1)-th row and the j-th column in the first GOA unit region is $G_{2m(i+1)-2j+1}$, wherein i is an odd number.

16. The display device according to claim 12, wherein a GOA unit at a z-th row and a w-th column in the second GOA unit region is $G_{2y(z-1)+2w}$, and a GOA unit at a (z+1)-th row and the w-th column in the second GOA unit region is $G_{2y(z+1)-2w+2}$, wherein z is an odd number.

* * * * *